Sept. 15, 1970 N. E. SINDLINGER 3,528,627
MINIATURE TAPE PHONOGRAPH DRIVE SYSTEM
Filed Feb. 29, 1968 2 Sheets-Sheet 1
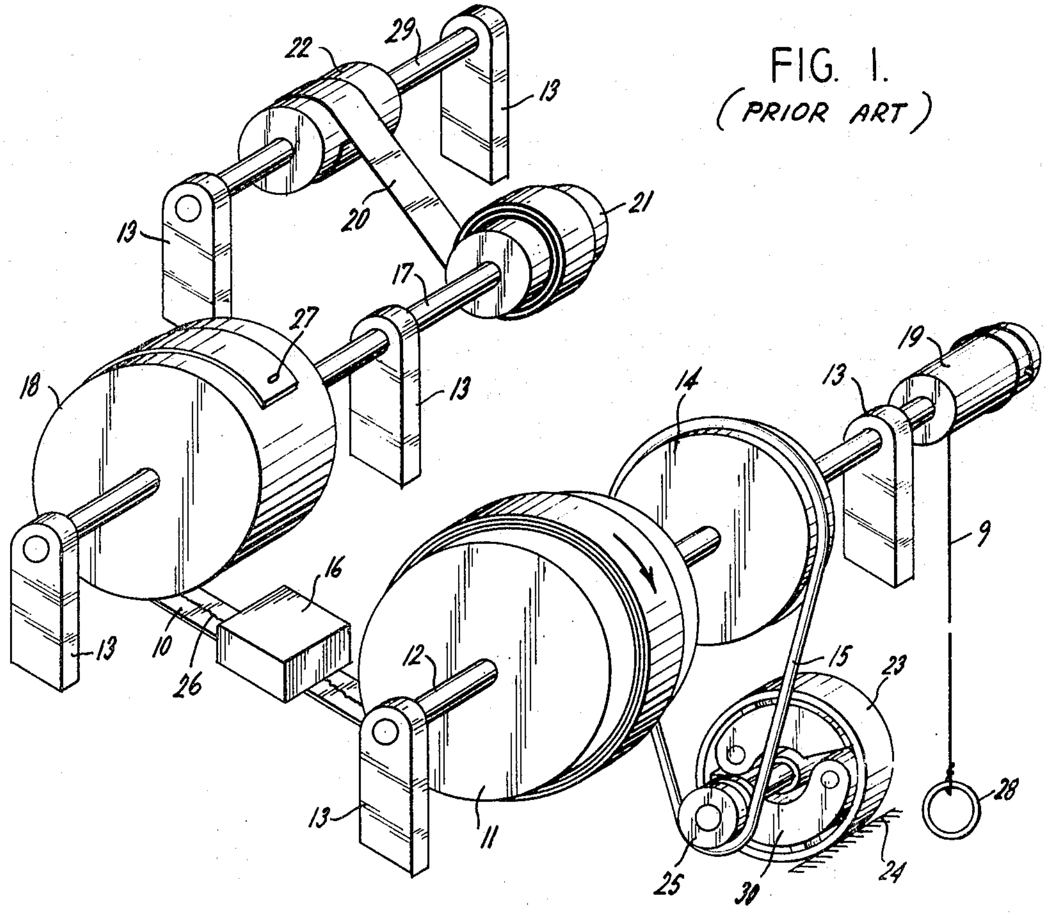
FIG. 1. (PRIOR ART)
FIG. 3.
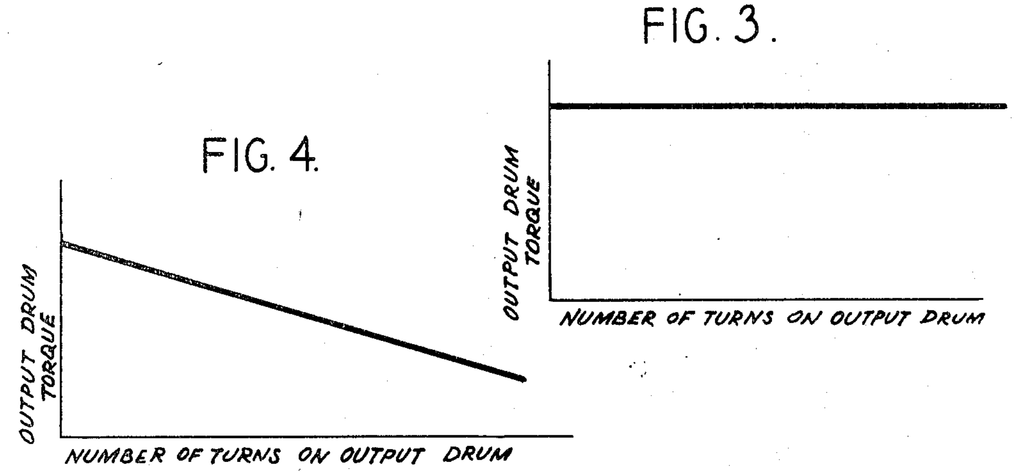
FIG. 3. FIG. 4.
INVENTOR
NORMAN E. SINDLINGER
BY
Amster & Rothstein
ATTORNEYS

MINIATURE TAPE PHONOGRAPH DRIVE SYSTEM

Filed Feb. 29, 1968 2 Sheets-Sheet 2

INVENTOR
NORMAN E. SINDLINGER
BY
Amster & Rothstein
ATTORNEYS 3,528,627

MINIATURE TAPE PHONOGRAPH DRIVE SYSTEM

Norman E. Sindlinger, Medford Lakes, N.J., assignor to Ideal Toy Corporation, New York, N.Y., a corporation of New York Filed Feb. 29, 1968, Ser. No. 709,360
Int. Cl. G11b *15/32, 15/43*
U.S. Cl. 242—201 3 Claims

ABSTRACT OF THE DISCLOSURE

A miniature tape audio device for use in toy dolls and the like. The tape is transferred from a supply drum to a take-up drum during each play. Because a constant tape speed is required for proper sound reproduction, the prior art designs have incorporated relatively large diameter drums and/or short tapes to decrease tape speed variations which would otherwise occur as a result of tape buildup effects. In the invention, small diameter drums are used but linear tape speed variations are still prevented. As in prior art designs a spring motor is operatively coupled to the takeup drum for rotating it during the play. In the invention, however, the spring torque has a negative gradient, that is, the torque decreases as the spring is initially wound. Since the spring torque increases during playback this has the effect of speeding up the tape to counteract the decreasing speed as a result of tape buildup effects. The overall tape speed is constant, yet a small size design is possible, and improvements in overall message quality are obtained.

This invention relates generally to audio devices for use in dolls, toys and the like, and more particularly to a tape phonograph which is very small.

In a miniature phonograph of the tape variety there is generally provided both a takeup drum and a supply drug, between which the phonograph tape is transferred during windup and playback. During the winding operation, the tape is transferred to the supply drum, e.g., by the pulling out of a drawstring. At the same time, a spring, attached to the takeup drum, is wound up. Upon release of the string, the spring unwinds and turns the takeup drum. The tape is transferred from the supply drum to the takeup drum. During playback, the tape is in contact with a stylus and speaker, and the message recorded on the tape is heard by the child.

The message recorded on the tape is such that for proper play the tape must travel at a constant speed past the stylus. If the linear speed of the tape varies, the pitch of the audible message will change. It is common practice to incorporate a mechanical governor in the audio device for the purpose of maintaining a constant tape speed during play. But the prior art approach has not permitted miniature designs of acceptable message quality.

As the tape unwinds from the supply drum and winds up on the takeup drum, it is apparent that the outside tape diameter of the supply drum decreases and the tape diameter of the takeup drum increases. As will be shown below, these tape buildup effects tend to decrease the linear speed of the tape as play progresses.

In the prior art, the variable tape feed problem has been ignored or has been overcome with a brute force approach. The takeup and supply drums have been made with large diameters and/or short tapes have been used to avoid tape buildup effects. Both diameters have been made large enough such that the percentage change between the diameter of a fully wound drum and a fully unwound drum is small. For example, if the thickness of the layers of tape on a fully wound drum is no more than five percent of the radius of the drum itself (with no tape wound on it), variations in the pitch of the reproduced sound will be tolerable. These large drums are one of the major contributing factors to the large size of prior art devices and/or the use of short tapes.

It is the general object of this invention to provide a tape phonograph device in which small diameter takeup and supply drums may be used for allowing miniature designs of high message quality.

Briefly, in accordance with the principles of my invention small diameter takeup and supply drums are used. The tape buildup effects tend to decrease the speed of the tape as the play progresses as in the prior art designs. The motor spring is wound between spring output and storage drums. The spring output drum is connected on the same shaft with the tape takeup drum (or can be part of the same drum). During the windup operation, the spring is transferred to its output drum just as the tape is transferred to its supply drum. When the string is released by the child, the spring transfers to the spring storage drum, and in so doing turns the tape takeup and supply drums. The conventional Negator spring which has been used in the prior art exhibits a torque characteristic such that the torque applied to the spring output drum remains essentially constant as the spring winds up on the drum. In the invention, however, the spring which is used has a negative gradient characteristic, i.e., the torque decreases as the spring is wound up on the output drum. On playback the spring torque increases as play progresses. This has the effect of increasing the linear speed of the tape. Depending upon the specific governor characteristics the increase in tape speed as a result of the increasing spring torque counteracts the decreasing speed of the tape arising from tape buildup effects. As a result, the tape speed is constant. Thus, very small size drums can be used in the arrangement, an overall miniature audio device can be constructed, and relatively long tapes may be employed.

The governor should be designed so that its characteristics match the spring gradient. Generally, the purpose of a governor is to maintain a constant angular velocity of the tape supply drum under variable load conditions. As will become apparent below, in accordance with the principles of my invention the angular velocity of the tape supply drum should increase as the play progresses. This permits the use of a "low-performance governor," which of course reduces the overall size and cost of the device.

Further objects, features and advantages of the invention will become apparent upon consideration of the following detailed description in conjunction with the drawing, in which:

FIG. 1 depicts in schematic form a prior art type miniature tape phonograph in which relatively large diameter tape takeup and supply drums and a large governor are required, with the sizes based upon a 5% change in linear speed during the course of play;

FIG. 3 depicts the torque characteristic of a typical Negator spring used in prior art designs;

FIG. 4 depicts the characteristic of the spring used in the illustrative embodiment of the invention;

Figure 2:
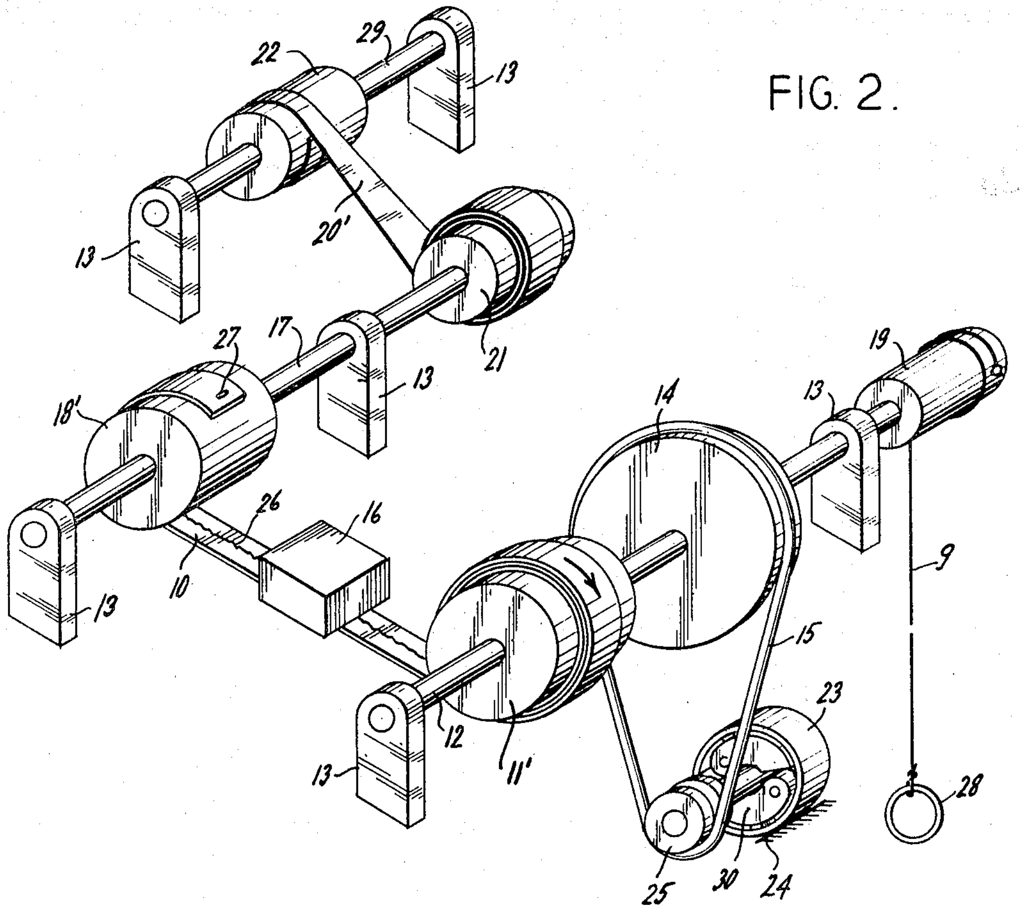
FIG. 2 depicts an illustrative embodiment of my invention, in which the reduced size of the tape takeup and supply drums and governor is apparent.

FIG. 1 depicts a prior art tape phonograph device. Since the construction of such devices are well known, the basic components thereof are shown only symbolically in the drawing. Groove 26 in tape 10 has recorded in it the message which is heard during each play. One end of the tape is secured to takeup drum 18 as shown at 27. The other end of the tape (not visible in the drawing) is secured to supply drum 11. In the rest condition, almost all of the tape is wound on drum 18. When the child desires to play the device ring 28 is pulled. Typically, the entire device is contained within a doll, with ring 28 being external to the doll body and string 9 extending through a hole in the body. When ring 28 and string 9 are pulled, drum 11 is turned in a direction opposite to that shown by the arrow in the drawing, and the tape is wound on this drum. Upon release of the string spring 20 causes shaft 17 to turn and transfer the tape from drum 11 back to drum 18. As the tape passes playback unit 16, a stylus (not shown) picks up the message recorded in groove 26 to audibly reproduce it. At the end of the play the tape remains on drum 18 until string 9 is once again pulled by the child.

Shaft 12 is mounted in posts 13 secured to frame 24. The shaft is freely rotatable in the posts, and has attached to it tape supply drum 11, pulley 14 and string drum 19. With the string fully wound on drum 19, it is apparent that the pulling of ring 28 causes the drum to rotate in the counterclockwise direction. This in turn causes drum 11 to rotate in the direction opposite that shown in the drawing by the arrow, and tape 10 to be unwound from drum 18 and wound up on drum 11.

Shaft 17 is also secured in two posts 13. Attached to the shaft are both tape takeup drum 18 and spring output drum 21. During the winding operation, as the tape is unwound from drum 18, shaft 17 turns in the counterclockwise direction. Motor spring 20 is secured at one end to spring output drum 21 and at the other end allowed to loosely coil about spring storage drum 22. Drum 22 is secured to shaft 29 which is mounted in an additional two posts 13. The spring has a tendency to wind up on drum 22. As drum 21 is turned during the winding operation and the spring transferred, potential energy is stored in it.

Upon release of the string by the child, spring 20 transfers back to drum 22. In the process, drum 21, shaft 17 and drum 18 are turned in a clockwise direction. Tape 10 is transferred from drum 11 to drum 18 and the message recorded on it is played back. Drum 11 is rotated in the direction shown by the arrow, and shaft 12 and drum 19 turn with it. As drum 19 turns, the string is pulled into the doll and wound up on the drum.

To control the angular velocity of drum 11 during playback, governor 23 is provided. Belt 15 is wrapped around pulleys 14 and 25. Since pulley 14 is attached to shaft 12, the pulleys and belt turn during playback. (They also turn during windup, but the governor operation is not required at this time. For this reason, the device may include a clutch mechanism as is known in the art.) As pulley 25 turns, conventional flyweights 30 rotate and develop a retarding force as they bear against the stationary case 23 which is fixed to frame 24. The operation of such a governor mechanism is well known.

At the beginning of the play the effective diameter of takeup drum 18 is at its smallest value. The first layer of tape wrapped around the drum during the play of the unit is wrapped directly around the drum surface. As layer after layer of tape builds up on the drum, the effective diameter of the drum for the tape being wound around it increases. Similarly, the effective diameter of supply drum 11 continuously decreases the linear speed of the tape since the net torque applied to the governor decreases.

Assuming that spring 20 in FIG. 1 applies a constant torque to takeup drum 18, as the effective diameter of takeup drum 18 increases, the tape tension decreases, since the torque applied by the tape to the drum opposing the spring torque is a function of the product of the tape tension and the effective drum diameter. Thus, the tension in the tape leaving drum 11 decreases. At the same time that the tension is decreasing, so is the effective radius of drum 11. The decreasing tension and drum radius both cause a smaller torque to be applied to supply drum 11 with a resulting reduction in the angular velocity of the drum as the governor speed drops to balance the new torque value. As the angular velocity of the supply drum decreases, less and less tape is fed from the drum. This is not normally the major source of tape speed variations, however, because the governor regulates the drum angular velocity according to its design characteristics.

The tape feed decreases primarily because as the supply drum diameter decreases, the length of tape comprising any one turn gets smaller and smaller, and even were the angular velocity of the supply drum to remain constant, less and less tape would be fed out as the play progresses.

The approach which is generally taken to minimize tape speed variations is to use large diameter tape takeup and supply drums. By using large diameter drums, the buildup effects may be made small. Typically, with the tape fully wound around drum 11, the thickness of the tape layers is equal to .05 of the overall diameter at the beginning of the play. The effective diameter of the drum changes by approximately 5% during the course of the play. The effective diameter of drum 18, which is smaller than drum 11, increases during the play slightly more than 5%. The small buildup effects in a conventional design do not deleteriously affect the speed of the tape to the extent where changes in pitch would become intolerable. The disadvantage of the prior art audio device, however, is that the drums contribute substantially to the overall volume (unless very short tapes are used or poor quality is accepted), and audio devices of miniature dimensions are not possible with the use of such drums.

There are two main differences between the prior art mechanism of FIG. 1 and the illustrative embodiment of my invention shown in FIG. 2. First, the diameters of the takeup and supply drums 18' and 11' and the governor are considerably smaller for the same tape length and linear playback speed. This, of course, permits a miniature construction. The second difference relates to the spring 20'. Since torque is directly proportional to spring width, the width of the spring is tapered such that the torque applied to drum 21 increases as the spring is unwound from this drum. Because of the use of such a spring, small diameter tape takeup and supply drums may be used. In the illustrative embodiment of FIG. 2, the thickness of the tape when it is fully wound on the supply drum is approximately 30% of the overall diameter of the fully wound drum (including the drum itself and the tape layers). The tape buildup effects are substantial and tend to reduce the linear speed of the tape as the play progresses. However, because the torque applied to drum 21 increases as the play progresses and tends to progressively increase the linear speed of the tape, it compensates for the tape buildup effects, and the speed of the tape is relatively constant throughout the play.

A mathematical analysis may be helpful in understanding the problem presented by tape buildup effects in the prior art, and their solution in the invention by using a spring having a negative gradient characteristic. It can be shown that the angular velocity $\theta$ (in radians) of the tape supply drum can be expressed by the following equation: $T=k(d/D)\theta^2$, where $k$ is a constant, $d$ is the diameter of the tape takeup drum, D is the diameter of the tape supply drum, and T is the torque applied by spring 20 to drum 21. The tape speed is equal to the product of the diameter of the supply drum (that is, the effective diameter including the tape layers) and half the angular velocity $\theta$ of the drum. Expressing the angular velocity in terms of the torque, the tape speed S, as a function of the two drum diameters, is:

$$S=(D/2)(TD/kd)^{1/2}=(1/2)(T/k)^{1/2}(D^{3/2})/(d)^{1/2}$$

It is thus seen that the tape speed varies in accordance with the 3/2 power of the supply drum diameter and the 1/2 power of the takeup drum diameter. It should be noted that the supply drum diameter D decreases during the play, thus contributing to a decrease in the tape speed. The takeup drum diameter $d$ increases as the play progresses, but because the factor $(d)^{1/2}$ is in the denominator of the expression, the increase in $d$ also tends to decrease the tape speed.

The tape speed also varies in accordance with the 1/2 power of the spring torque. FIG. 3 depicts a typical Negator spring used in prior art designs. As the spring is progressively transferred from drum 21 to drum 22 the torque remains constant. (Note that since the graph of FIG. 3 is plotted for increasing turns around drum 21, the characteristic must be followed from right to left to determine the torque during play when the number of turns on the supply drum progressively decreases.) Consequently, the reduction in the tape speed is unaffected by the input spring torque.

Variations of tape speed have been prevented in the prior art designs by utilizing large diameter drums and/or short tapes. With such drums and tapes, the overall drum diameters (including the tape layer thicknesses) do not vary substantially and tape buildup effects are minimal. The linear speed of the tape still varies in accordance with the spring torque, or system friction and load variations. However, the governor incorporated in the mechanism serves to maintain the angular velocity of the tape supply drum at a constant value. Since the effective radius of the drum is also approximately constant because the drum diameter is large, the tape speed, which is the product of the angular velocity of the drum and its radius, is also relatively steady. Thus, the governor, by regulating the angular velocity of the drum, maintains a reasonably uniform tape speed. But the large size drums contribute to an overall size which may be unacceptable for use in miniature toys and dolls.

In accordance with the principles of my invention, and as depicted schematically in FIG. 2, small sized drums may be used. As described above, this has the tendency to decrease the linear speed of the tape as the play progresses. In my copending application Ser. No. 709,359, filed Feb. 29, 1968, there is disclosed a miniature tape audio device in which small tape drums are used. The spring which is incorporated in that design is of the type which provides a substantially constant torque. Thus, the speed of the tape does not progressively decrease as a result of a decreasing spring torque. The speed of the tape, however, does decrease because of tape buildup effects. In the invention disclosed in my copending application, the recording on the tape is such that for proper play a decreasing tape speed is required. In the present invention, the recording is such that for proper play a constant tape speed is required. Although the tape buildup effects tend to progressively decrease the tape speed, a constant tape speed is maintained by using a spring having a negative gradient characteristic as shown in FIG. 4. (The characteristic, as will be shown below, should vary with the cube of the diameter of the outer tape layer on the tape supply drum, but in the range of interest the characteristic is essentially linear as depicted in FIG. 4.) The spring torque increases as the tape is wound up on the tape storage drum during the course of the play. The increase in torque tends to progressively increase the speed of the tape, which when taken together with the tape buildup effects results in a constant tape speed.

The negative gradient spring which is used in the present invention is commercially available from the Hunter Spring division of Ametek, Inc. There are a number of ways of manufacturing a negative gradient spring, and reference may be made to Pats. Nos. 2,609,191; 2,609,192; and 2,609,193 for a general discussion of such negative gradient springs.

That the use of a negative gradient spring can result in a constant tape speed, even with radically changing tape takeup and supply drum diameters, can be appreciated from an examination of the basic tape speed equation previously derived $S=(1/2)(T/k)^{1/2}(D)^{3/2}/(d)^{1/2}$. For a constant tape speed equal to K, this equation can be transformed to the following form: $T=4(K^2k)(d/D^3)$. In order for a constant speed to be maintained, the spring torque must vary in accordance with $d/D^3$. As the play progresses $d$ increases, tending to increase the value of the required spring torque. Also as the play progresses, D decreases, but since the term $D^3$ is in the denominator of the expression, the decreasing value of D also tends to increase the value of the required torque.

In summary, even though small diameter drums are used, a constant tape speed may be maintained if the spring torque increases as the play progresses. This can be achieved with the use of a spring having a negative gradient characteristic.

Figure 5:
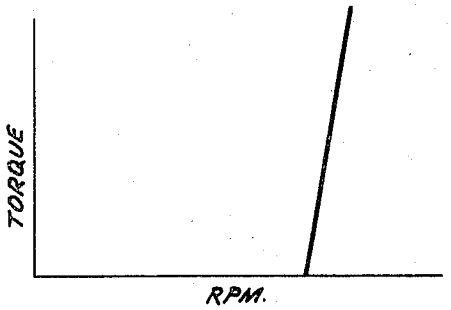
FIG. 5 depicts the torque characteristic of the governor used in a typical prior art design.
Figure 6:
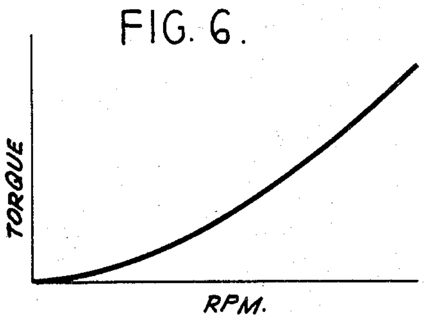
FIG. 6 depicts the torque characteristic of the governor used in the illustrative embodiment of the invention.

In prior art designs, the governor serves the function of maintaining the angular velocity of the tape supply drum at a constant value. For reasonably constant angular velocity a governor having a preloading spring should be used so that the governor operates very near a set point. As the spring load approaches the flyweight centrifugal force at the set point, torque charges of 100% or more with less than a 5% speed change may be obtained. FIG. 5 depicts the torque characteristic of a preloaded governor as a function of the angular velocity of the tape supply drum. FIG. 6 depicts the torque characteristic of a governor with no preloading. The preloaded governor does not develop torque until after a higher minimum speed is attained and it is seen that in the characteristic of FIG. 5 the torque curve has a relatively steep slope, whereas the torque curve of FIG. 6 has a smaller slope which intersects the horizontal axis at the origin.

In the illustrative embodiment of the invention as shown in FIG. 2, the angular velocity of the tape supply drum should not be maintained constant during the play. Since the effective diameter of the supply drum gets smaller and smaller as the play progresses, for a constant tape speed the angular velocity of the drum must increase in inverse proportion to the decreasing diameter. The increasing angular velocity is achieved with the use of the negative gradient spring. In this case the governor must permit a significant increase in angular velocity. Consequently a miniature, low-performance governor not only can be used in the design, but should be used for proper operation. The governor serves to maintain the desired range of angular velocity of the supply drum rather than a nearly constant value.

Another added advantage of the invention is that the message length may be increased. Because with smaller drums larger tape layer thicknesses are possible within any given volume, longer tapes may be used.

Although the invention has been described with reference to a particular embodiment, it is to be understood that this embodiment is merely illustrative of the application of the principles of the invention. For example, in a device having a multiple message tape on which a number of parallel tracks are provided with a selection mechanism, the same spring powering mechanism and miniature drums could be used. Thus, numerous modifications may be made in the illustrative embodiment of the invention and other arrangements may be devised without departing from the spirit and scope of the invention.

What is claimed is:

1. A miniature phonograph tape audio device comprising a tape takeup drum, a tape supply drum, a message phonograph tape attached at opposite ends thereof to said tape takeup and supply drums, sound reproducing means adjacent said tape for reproducing the signals recorded on said tape as said tape is transferred from said tape supply drum to said tape takeup drum, said tape takeup and supply drums having diameters small enough to cause substantial tape buildup effects during the transfer of said tape from said tape supply drum to said tape takeup drum and, in the absence of any compensating factor, substantial variations in the linear speed of said tape from the beginning of said transfer until the end of said transfer, spring motor means including a spring operatively connected to said tape takeup drum to control the rotation of said tape takeup drum such that said tape is transferred from said tape supply drum to said tape takeup drum, windup means for winding up said spring and for transferring said tape from said tape takeup drum to said tape supply drum, said spring having a torque characteristic such that as it continues to cause said tape takeup drum to turn in the direction to transfer said tape to said tape takeup drum it applies a continuously increasing torque to said tape takeup drum to compensate for said tape build up effects such that said tape moves past said sound-reproducing means at a substantially constant speed from the beginning until the end of the transfer of said tape from said tape supply drum to said tape takeup drum, and governor means coupled to said tape supply drum for regulating the angular velocity of said tape supply drum such that it increases significantly during the course of each transfer of said tape from said tape supply drum to said tape takeup drum.

2. A miniature phonograph tape audio device in accordance with claim 1 further including a spring output drum axially connected to said tape takeup drum, and a spring storage drum, said spring being wound on said spring output and storage drums such that said spring has a natural tendency to coil itself about said spring storage drum.

3. A miniature phonograph tape audio device in accordance with claim 2 wherein said windup means includes a string-receiving drum axially connected to said tape supply drum, and a string attached to said string-receiving drum.

References Cited

UNITED STATES PATENTS

| | | | |
|---|---|---|---|
| 2,609,192 | 9/1952 | Lermont | 267—1 |
| 3,285,612 | 11/1966 | Hallamore. | |
| 3,389,915 | 6/1968 | Owen et al. | 274—11 X |

GEORGE F. MAUTZ, Primary Examiner

U.S. Cl. X.R.

46—117; 242—207